April 14, 1953 V. EGLITIS 2,634,962
MOBILE DIGGING AND PICKUP DEVICE FOR
LOOSENING AND CONVEYING MATERIAL
Filed Nov. 10, 1950 2 SHEETS—SHEET 2

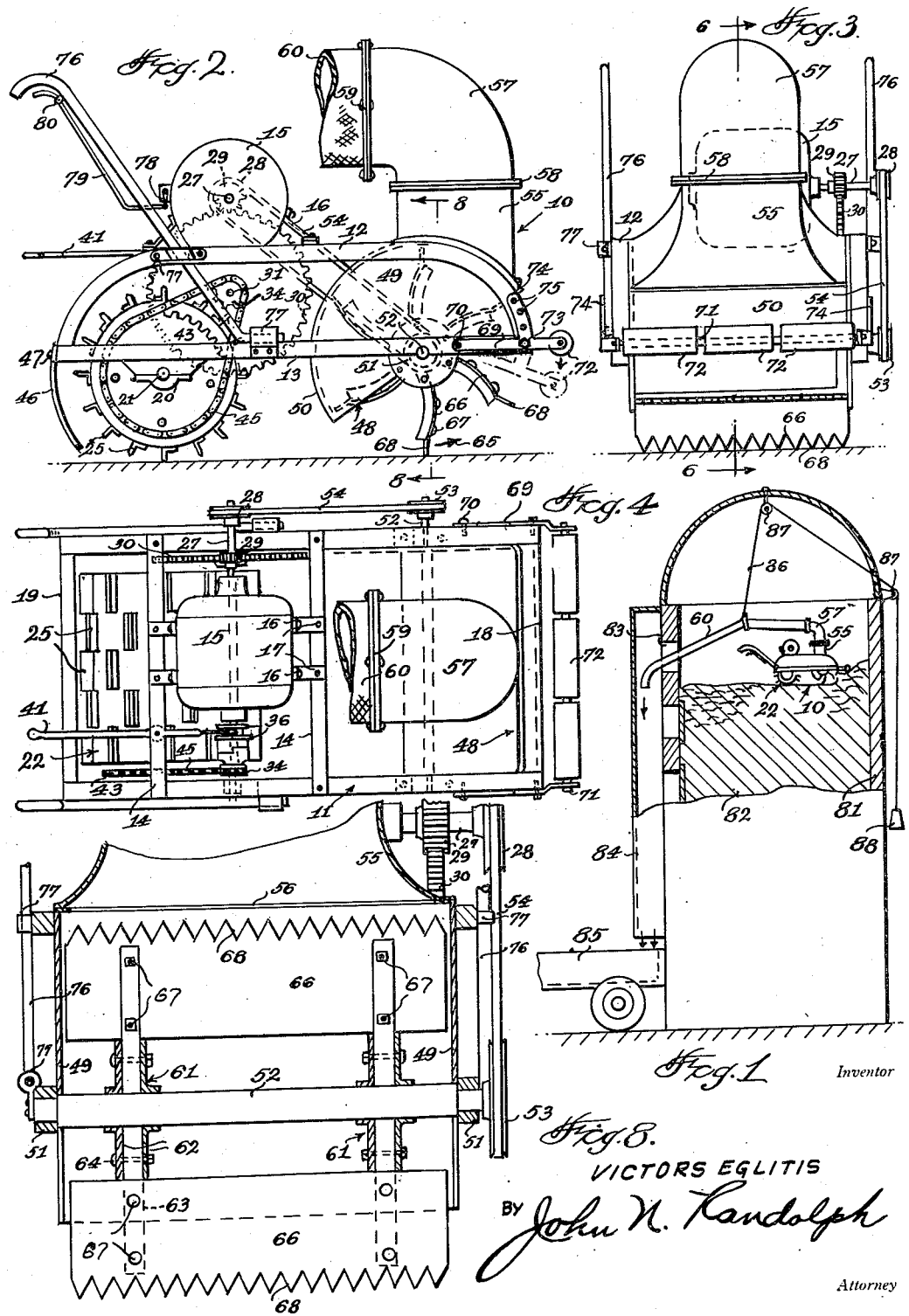

Inventor
VICTORS EGLITIS
By John N. Randolph
Attorney

Patented Apr. 14, 1953

2,634,962

UNITED STATES PATENT OFFICE 2,634,962

MOBILE DIGGING AND PICKUP DEVICE FOR LOOSENING AND CONVEYING MATERIAL

Victors Eglitis, Chicago, Ill.

Application November 10, 1950, Serial No. 195,045

7 Claims. (Cl. 262—8)

This invention relates to a self propelled mobile pick-up and conveying device for loose materials such as silage, fodder, straw, hay and similar materials and has for its primary object to provide a self propelled machine adapted to be operated in a silo or in a pile or mass of silage or fodder for digging the material from the mass and for propelling the material by air pressure through the discharge conduit of the machine and into a receptacle or other place in which it is to be loaded as for example into a truck or wagon body.

More particularly, it is an aim of the invention to provide a machine of relatively simple construction which is light in weight so that it can be easily lifted into place in the top of a silo or onto a pile of silage or fodder and which may be readily steered by the operator from a standing position behind the machine and while the machine is being conveyed over the top of the mass of material by power supplied from its prime mover so as to prevent the machine from burying itself in one particular portion of the silage or fodder.

Another aim of the invention is to provide a novel traction means on which the machine is primarily supported and by which the machine can be propelled in a mass of silage or fodder.

A further object of the invention is to provide a machine including a blower adapted to be driven at a high speed relatively to the traction means of the machine and by a power source of the machine common to the blower and traction means and which blower is provided with fan blades having digging means for digging the silage or fodder from the mass and for moving it to a position to be propelled through and expelled from the conduit of the machine.

Still another object of the invention is to provide an adjustable means forming a partial support for the machine for regulating the depth at which the fan blades will dig into the silage or fodder.

Various other objects and advantages of the invention will hereinafter become more fully apparent from the following description of the drawings, illustrating a presently preferred embodiment thereof, and wherein:

Figure 1 is a side elevational view of the machine on a reduced scale shown in an operative position within a silo which is illustrated partly in side elevation and partly in vertical section;

Figure 2 is an enlarged side elevational view of the machine looking toward the right-hand side thereof as viewed from rear to front and with the conveyor conduit broken away;

Figure 3 is a front elevational view thereof looking from right to left of Figure 2;

Figure 4 is a top plan view of the machine;

Figure 8 is an enlarged fragmentary cross sectional view taken substantially along a plane as indicated by the line 8—8 of Figure 2.

Figure 6:
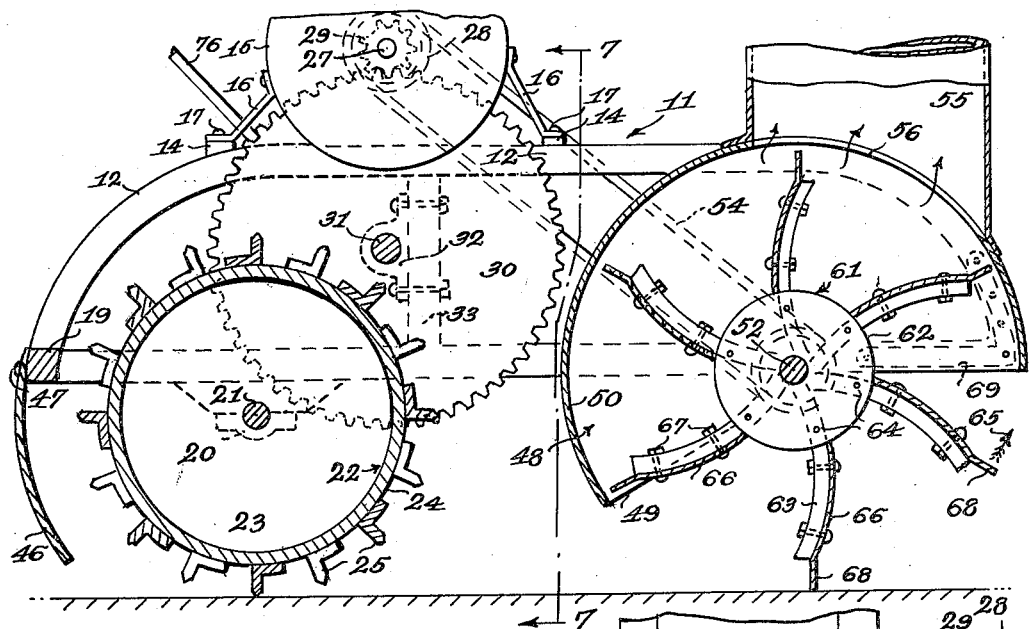
Figure 6 is an enlarged fragmentary longitudinal sectional view taken substantially along a plane as indicated by the line 6—6 of Figure 3.

Referring more specifically to the drawings, the self propelled pick-up and conveying machine in its entirety is designated generally 10 and includes an elongated rectangular frame, designated generally 11 having upper and lower side frame members 12 and 13, respectively. The upper frame members 12 have downwardly curved ends which merge with the ends of the lower frame members 13 and said upper frame members 12 rearwardly from an intermediate point of the frame 11 are provided with cross members 14 which are secured thereto and which provide a support for a prime mover 15 the base 16 of which is secured by fastenings 17 to the cross members 14 for supporting the prime mover 15 above and transversely of the frame 11. The prime mover 15 is disclosed in the drawings as an electric motor and as the description proceeds it will be readily apparent that an internal combustion engine could be utilized. The frame 11 includes a front cross member 18 constituting the front end of the frame 11 and a rear cross member 19 constituting the rear end of said frame and which frame members 18 and 19 are disposed in the same plane as the lower side frame members 13.

Figure 7:
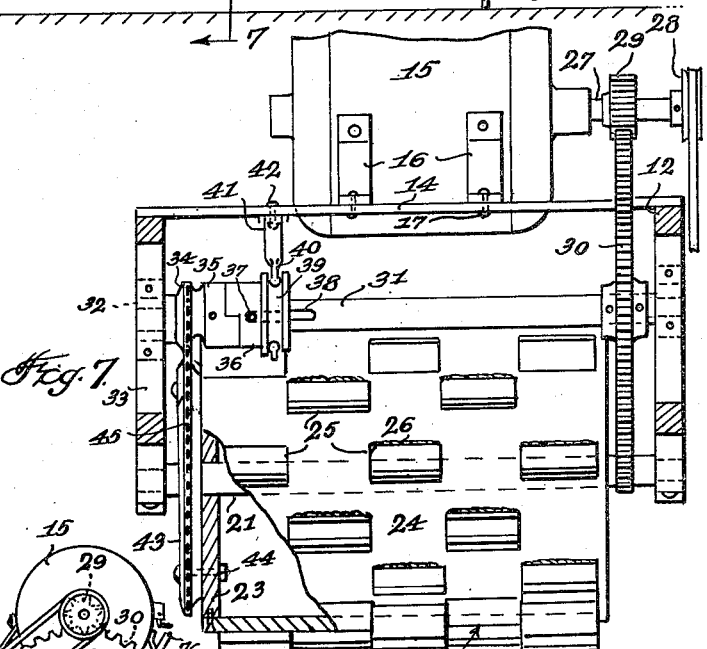
Figure 7 is a cross sectional view of the machine taken substantially along a plane as indicated by the line 7—7 of Figure 6.
Figure 5:
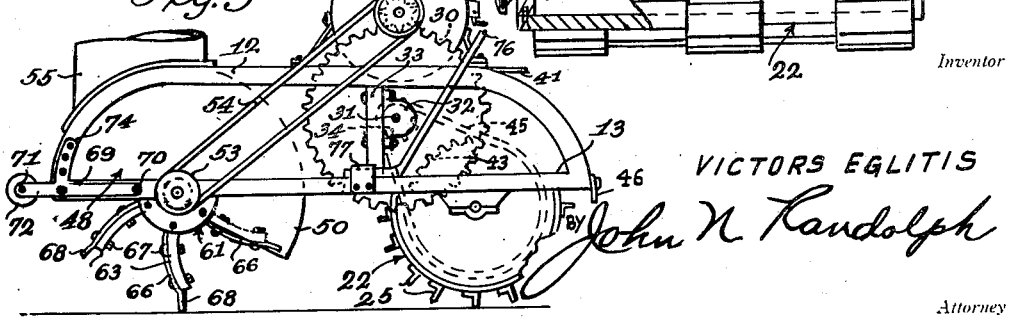
Figure 5 is a fragmentary side elevational view looking toward the opposite or left-hand side thereof.

A pair of transversely aligned bearings are secured beneath the frame 11, one to each of the frame members 13 adjacent to but spaced forwardly from the rear frame member 19 and said bearings 20 journal a shaft 21 which extends axially through a drum 22 and which is secured to the end walls 23 of said drum, so that the drum 22 is rotatably supported partially within and partially beneath the frame 11, as best illustrated in Figures 6 and 7. The cylindrical wall 24 of the drum 22 is provided with a plurality of cleats 25 which are welded or otherwise secured thereto, as seen at 26 each of which is of angular construction having a side disposed against and secured to the cylindrical wall 24 and a side which projects radially therefrom, as best illustrated in Figures 2, 6 and 7.

The motor or engine 15 is provided with a drive shaft 27 which extends therefrom transversely of the machine and toward its left-hand side and to which a belt pulley 28 is fixed outwardly of the left-hand side of the frame 11. A small pinion 29 is fixed to the drive shaft 27 inwardly of the left-hand side of the frame 11 and meshes with a large gear 30 which is secured to a countershaft 31. The countershaft 31 extends transversely through the frame 11 above and forwardly of the axis of drum 22 and is journaled in bearings 32 which are secured to upright frame members 33 which extend between and are secured to the side frame members 12 and 13. The gear 30 is disposed between the left-hand side of the frame 11 and the adjacent end of the drum 22, as seen in Figure 4, and a small sprocket wheel 34 is turnably mounted on the countershaft 31 adjacent the right-hand side of the frame 11 and beyond the opposite end of the drum 22, as best seen in Figure 7. The sprocket wheel 34 has a clutch half 35 fixed to and projecting from its inner side which is normally engaged by a clutch half 36 which is slidably keyed to the shaft 31 by a pin 37 which is anchored therein and extends loosely through a longitudinal slot 38 of the shaft 31. The clutch half 36, remote to the clutch half 35, is provided with an annular groove 39 to loosely receive a fork 40 forming one end of a clutch actuating lever 41 which extends rearwardly from the clutch 35, 36 and which is pivotally connected at 42 to the rear cross frame member 14. Accordingly, it will be readily apparent that the rear end or handle portion of the lever 41, which is located beyond the rear end of the frame 11 may be swung in one direction horizontally to engage the clutch and in the opposite direction to disengage the clutch and that the sprocket wheel 34 will be driven by the shaft 31 only when the clutch is engaged as illustrated in Figure 7. A large sprocket wheel 43 is secured to the right-hand end wall 23 of the drum 22 and on the outer side thereof by nut and bolt fastenings 44 and is of annular construction to be disposed around the shaft 21. The large sprocket wheel 43 is disposed in alignment with the sprocket wheel 34 and said sprocket wheels are connected by an endless chain 45 by which the drum 22 is driven from the countershaft 31. A shield 46 extends across the rear end of the frame 11 and is secured at its upper edge by fastenings 47 to the rear frame member 19 and extends downwardly and is curved inwardly therefrom, said shield 46 terminating above the level of the lowermost cleats 25 and being spaced rearwardly from the cleats and substantially concentric to the drum 22.

A blower casing, designated generally 48, is mounted in the forward part of the frame 11 and includes corresponding side walls 49 which are secured to the side portions 12, 13 of the frame 11 and an arcuate outer wall 50 the forward end of which terminates at the level of the bottom of the frame 11 and the rear end of which extends downwardly a substantial distance below the level of the frame 11, as best seen in Figure 6. The bottom edges of the side walls 49 have forward portions terminating at the level of the bottom of the frame 11 and rear edges which are inclined downwardly and rearwardly to the lower edge of the rear end of the outer wall 50. A pair of transversely aligned bearings 51 each including a detachable section are secured in the forward part of the frame 11 with one of said bearings connected to each of the bottom frame members 13. A shaft 52 extends transversely through the frame 11 and is journaled in the bearings 51 and supported thereby axially of the outer wall 50 of the blower casing 48. As best seen in Figure 8, the shaft 52 extends beyond the left side of the frame 11 and has a belt pulley 53 fixed thereto outwardly of the frame 11 and in longitudinal alignment with the belt pulley 28. An endless belt 54 connects the belt pulleys 28 and 53 for driving the shaft 52 directly from the motor drive shaft 27. As best illustrated in Figures 6 and 8, the blower casing 48 is provided with an upwardly extending conduit section 55 which is fixed to and rises from the upper and forward portion of the outer wall 50 and which is secured thereto around an opening 56 of the wall 50. One end of an elbow joint 57 is swivelly connected at 58 to the upper end of the conduit section 55 and the opposite end of the elbow joint or conduit 57 is fastened as seen at 59 to one end of a flexible conduit 60 which may be of any desired length and which may be formed of canvas or other suitable flexible material provided with suitable means, not shown, to prevent collapsing of said conduit section 60. The conduit sections 55, 57 and 60 have substantially the same internal diameter.

A pair of hubs 61 each formed of a pair of spaced disk-shaped sections 62 is secured to the shaft 52 between the casing walls 49 and a plurality of spokes 63 are secured to each hub 61 between its disk sections 62 by fastenings 64 and said spokes 63 extend outwardly from the peripheries of the hubs 61. As best illustrated in Figure 6, the spokes 63 are curved from end-to-end thereof in corresponding directions and are each secured to its hub 61 preferably by a single fastening 64. However, the spokes 63 are retained rigidly with respect to the hubs and shaft 52 due to the fact that the inner ends of the spokes abut against one another and against the shaft 52 as seen in Figure 6 to prevent any swinging movement of the spokes relatively to the hubs or shaft. The shaft 52 turns in the direction as indicated by the arrow 65 in Figure 6 or counterclockwise, as will hereinafter be more fully described, and the spokes 63 are curved in the opposite direction to the direction of rotation of the shaft and hubs. A fan blade 66 is secured by fastenings 67 to corresponding transversely aligned spokes 63 of the two hubs 61 so that a fan blade 66 is provided for each spoke of each hub. In the embodiment as illustrated, the hubs 61 are shown as each being provided with six spokes 63 and accordingly the blower is provided with six fan blades 66. The fan blades 66 are curved to conform to the curvature of the forward or leading edges of the spokes 63 to which they are secured; however, each fan blade 66 has an outer free edge portion which extends beyond the outer ends of the spokes to which it is secured and which is bent to extend substantially radially from said outer ends of the spokes and which is notched to provide a toothed digging blade 68, as best illustrated in Figure 8.

A pair of arms 69 are supported on each side of the frame 11 and are pivotally mounted for vertical swinging movement by fastenings 70 which extend through the rear ends of the arms 69 and are anchored in the side frame members 13. The arms 69 extend forwardly beyond the forward end 18 of the frame. A shaft 71 extends between and is supported in the forward ends of the arms 69 forwardly of the frame end 18, as seen in Figure 4. One or a plurality of rollers 72 is journaled on the shaft 71. Each arm 69 is additionally supported by a removable fastening 73 which extends through an opening thereof into the forward end of the frame member 13, to which said arm is pivotally connected, and each arm 69 is provided with an upwardly extending arcuate extension 74 having a series of longitudinally spaced openings 75 which are disposed concentric to the pivots 70 to selectively receive the fastenings 73 for positioning the arms 69 in either horizontal positions or in downwardly inclined positions, as illustrated in dotted lines in Figure 2, for arranging the rollers 72 at different levels relatively to the frame, for a purpose which will hereinafter become apparent.

A pair of handle members 76 are supported on the frame 11 by brackets 77 which are secured to each of the side frame members 12 and 13, said handle members 76 extending upwardly and rearwardly to points above and beyond the rear end of the frame 11. The motor 15 is provided with a control lever 78 to which an operating rod 79 is pivotally connected. The operating rod 79 has an upper end which is supported by a bracket 80 adjacent the upper hand grip portion of one of the handles 76 so that the hand of the operator grasping said handle may also operate the rod 79 to move the lever 78 for varying the speed of the motor 15 and for stopping or starting said motor. If the motor or prime mover 15 is of the internal combustion type the lever 78 would constitute the throttle control thereof.

Figure 1 illustrates one application and use of the machine 10 for unloading silage from a silo 81, the machine being shown within the silo 81 on top of the mass of silage 82. The flexible conduit 60 is shown extending outwardly through an uncovered opening or window 83 of the silo 81 above the silo mass 82 and discharging into a downwardly opening silo conduit 84 beneath which the body of a truck or wagon 85 is disposed. The flexible conduit 60 is illustrated as being supported intermediate of its ends by a flexible member 86 which is trained over pulleys 87 which are supported by the silo 81 and the opposite end of which is disposed externally of the silo and has a weight 88 connected thereto to counterbalance the weight of the flexible conduit 60.

Assuming that the motor 15 is operated to drive the motor shaft 27 counterclockwise as seen in Figure 2, it will be readily apparent that the fan blades 66 will be driven in the same direction as indicated by the arrows 65 in Figures 2 and 6. The teeth 68 of the blades 66 will dig into the top of the silage mass picking up silage therefrom which will be conveyed upwardly thereby into the blower casing 48 and expelled from said casing by the air pressure produced by the fan blades 66 through the conduit sections 55, 57 and 60 to be discharged into the silo conduit 84 through which it will be conveyed by gravity and discharged into the truck body 85 or into any other suitable receptacle. It will be obvious that the fan blades 66 are revolved at a high rate of speed for accomplishing this operation. In order to prevent the digging teeth 68 from digging and ultimately burying the machine 10 in the silage 82, the machine is propelled while the digging and conveying operation, previously described, is being accomplished by rotation of the drum 22 in the opposite direction to the direction of rotation of the fan blades 66 due to the provision of the countershaft 31 which is driven in the opposite direction to the drive shaft 27 by the pinion 29 and gear 30 and it will also be readily apparent that the sprocket wheel and chain drive 34, 43, 45 will cause the drum 22 to revolve in the same direction as the countershaft 31 or clockwise as seen in Figure 6. Likewise, it will be obvious that the drum 22 will revolve at a very slow speed relatively to the speed of rotation of the blades 66 as the gear 30 secured to the shaft 31 is substantially larger than the pinion 29 secured to the drive shaft 27 and the sprocket wheel 34, connected to the shaft 31 is substantially smaller than the sprocket wheel 43 fastened to the drum 22. The cleats 25 which are arranged in staggered circumferential rows will dig into the top of the silage mass for conveying the machine thereover in a forward direction or from left to right as illustrated in Figures 1, 2 and 6. The rear end of the machine 10 is supported by the drum 22 and the forward end thereof is supported partially by the fan blade teeth 68 and primarily by the rollers 72 so that by adjusting the level of the rollers 72, the depth to which the teeth 68 will dig into the silage or other material may be varied, this adjustment being made depending upon the material being conveyed and the density of the mass thereof.

The machine 10 is adapted to be relatively light in weight so that it can be easily lifted into or out of a silo by the operator and so that it can be readily controlled and steered by the operator grasping the upper rear ends of the handles 76.

It will also be understood that the machine 10 is adapted for use in connection with other materials such as fodder, hay or straw and may be utilized in a mass of such materials not disposed in a silo. Various other modifications and changes are likewise contemplated and may obviously be resorted to, without departing from the spirit or scope of the invention as hereinafter defined by the appended claims.

I claim as my invention:

1. A self propelled pick-up and conveying machine for loose materials comprising a frame, a prime mover mounted on said frame, said frame including a forward end and a rear end, a relatively wide traction wheel journaled in the frame adjacent its rear end about a horizontal axis disposed transversely of the machine for supporting the rear end of the frame, a roller rotatably mounted on the frame adjacent the forward end thereof and constituting the primary support of said forward end, a reduction means connecting the prime mover and traction wheel for driving the traction wheel from the prime mover at a reduced speed relatively to the speed of rotation of a drive shaft of the prime mover, a blower including a blower shaft journaled in the frame adjacent the forward end of the frame and transversely of the machine for rotation about a horizontal axis, means forming a driving connection between the blower shaft and prime mover shaft for driving the blower shaft in the opposite direction to the direction of rotation of the traction wheel and at a greatly increased R. P. M. relatively to the rotational speed of the traction wheel, a plurality of fan blades forming a part of the blower fixed to and projecting radially from the blower shaft and partially supporting the forward end of the frame, each of said blades being curved in a direction radially of the blower shaft and away from the direction of rotation of said shaft, a plurality of digging blades projecting radially from the outer edges of the fan blades, said traction wheel and the downwardly extending blades of the blower each extending substantially below the machine frame, and a blower casing secured in the forward end of the frame and transversely thereof and provided with an open bottom, said casing enclosing the upper portion of the blower.

2. A machine as in claim 1, said prime mover being disposed rearwardly of the blower and above the traction wheel.

3. A machine as in claim 1, said traction wheel comprising a drum extending substantially from side to side of the frame and provided with a plurality of cleats projecting radially from its periphery and affording traction for moving the machine in a forward direction over a mass of loose material such as silage.

4. A machine as in claim 1, said roller extending across the machine frame in advance of its forward end, and means journaling the roller and supporting it on the frame above the level of the lower portion of said traction wheel, said roller supporting the forward end of the machine frame forwardly of the blower.

5. A machine as in claim 1, said roller extending across the machine frame in advance of its forward end, and means journaling the roller and supporting it on the frame above the level of the lower portion of said traction wheel, said roller supporting the forward end of the machine frame forwardly of the blower, and said roller supporting means being adjustably connected to the frame for supporting the roller at different levels relatively to the frame for varying the depth of operation of the digging blades.

6. A machine as in claim 1, the open bottom of said blower casing including a forward portion disposed in substantially a horizontal plane and at approximately the level of the bottom of the machine frame and a downwardly and rearwardly inclined rear portion terminating substantially below the bottom of the frame.

7. A machine of the character described comprising an elongated frame having a forward end and a rear end, a prime mover supported on and secured to the machine frame, a relatively wide traction wheel journaled in the rear end of the machine frame on a horizontal axis disposed transversely thereof and having a portion extending substantially below the frame, power take-off means connecting the traction wheel to the prime mover for driving the traction wheel at a reduced speed relatively to the R. P. M. of the prime mover and in one direction, a roller rotatably mounted on the frame adjacent the forward end thereof and constituting the primary support of said forward end, a blower connected to and journaled in the machine frame adjacent its forward end on a horizontal axis parallel to the axis of rotation of the traction wheel, said frame being supported at its rear end by the traction wheel and at its forward end partially by the blower, power take-off means connecting the blower to the prime mover for rotation of the blower in the opposite direction to the direction of rotation of the traction wheel and at a greatly increased R. P. M., said blower extending below the frame and including a casing having a bottom opening beneath the frame, said blower including a plurality of fan blades and a plurality of toothed digging blades extending radially from the outer edges of the fan blades adapted to dig into a mass of loose material on which the machine is supported for picking up material to be conveyed from the blower by said fan blades.

VICTORS EGLITIS.

References Cited in the file of this patent

UNITED STATES PATENTS

| Number | Name | Date |
|---|---|---|
| 1,518,505 | Gray | Dec. 9, 1924 |
| 1,570,806 | Walling | Jan. 26, 1926 |
| 1,588,745 | Kear et al. | June 15, 1926 |
| 2,474,840 | Greer | July 5, 1949 |

FOREIGN PATENTS

| Number | Country | Date |
|---|---|---|
| 300,927 | Germany | Sept. 29, 1917 |